United States Patent
Vaknin

(10) Patent No.: US 10,120,860 B2
(45) Date of Patent: Nov. 6, 2018

(54) METHODS AND APPARATUS TO IDENTIFY A COUNT OF N-GRAMS APPEARING IN A CORPUS

(71) Applicant: Intel Corporation, Santa Clara, CA (US)

(72) Inventor: Shlomi Vaknin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/387,059

(22) Filed: Dec. 21, 2016

(65) Prior Publication Data

US 2018/0173693 A1    Jun. 21, 2018

(51) Int. Cl.
*G06F 17/27* (2006.01)

(52) U.S. Cl.
CPC .......... *G06F 17/277* (2013.01); *G06F 17/275* (2013.01)

(58) Field of Classification Search
None
See application file for complete search history.

(56) References Cited

U.S. PATENT DOCUMENTS

| | | | | |
|---|---|---|---|---|
| 5,752,051 A * | 5/1998 | Cohen | ...................... | G06F 17/27 704/1 |
| 6,157,905 A * | 12/2000 | Powell | ................ | G06F 17/2217 704/2 |
| 7,020,587 B1 * | 3/2006 | Di | .......................... | G06F 17/27 703/2 |
| 7,877,258 B1 * | 1/2011 | Chelba | ................ | G06F 17/2715 704/240 |
| 8,468,011 B1 * | 6/2013 | Sites | ...................... | G06F 17/275 704/2 |
| 9,436,760 B1 * | 9/2016 | Tacchi | .............. | G06F 17/30684 |
| 2006/0206306 A1 * | 9/2006 | Cao | ...................... | G06F 17/2775 704/4 |
| 2010/0161314 A1 * | 6/2010 | Karttunen | ............ | G06F 17/2775 704/9 |
| 2010/0312545 A1 * | 12/2010 | Sites | ...................... | G06F 17/275 704/8 |
| 2013/0339000 A1 * | 12/2013 | Zhang | ................... | G06F 17/277 704/9 |

OTHER PUBLICATIONS

Berberich et al., "Computing n-Gram Statistics in MapReduce," Indraprastha Institute of Information Technology, Jul. 18, 2012 (13 pages).

Coppa, "Anatomy of a MapReduce Job," http://ercoppa.github.io/HadoopInternals/AnatomyMapReduceJob.html, retrieved on Dec. 21, 2016 (6 pages).

* cited by examiner

*Primary Examiner* — Douglas Godbold
(74) *Attorney, Agent, or Firm* — Hanley Flight & Zimmerman, LLC

(57) ABSTRACT

Methods, apparatus, systems and articles of manufacture to identify a count of n-grams appearing in a corpus are disclosed herein. An example method includes identifying a token that frequently begins a suffix found in the corpus. First suffixes and second suffixes are identified within the corpus, the first suffixes begin with the token and the second suffixes do not begin with the token. A first counting algorithm is performed to identify a first count of n-grams appearing in the first suffixes. A second counting algorithm is performed to identify a second count of n-grams appearing in the second suffixes. The second counting algorithm is different from the first counting algorithm.

24 Claims, 7 Drawing Sheets

_US 10,120,860 B2_

METHODS AND APPARATUS TO IDENTIFY A COUNT OF N-GRAMS APPEARING IN A CORPUS

FIELD OF THE DISCLOSURE

This disclosure relates generally to text processing, and, more particularly, to methods and apparatus to identify a count of n-grams appearing in a corpus.

BACKGROUND

In recent years, text processing systems have been used to process text (a corpus) and derive statistics concerning the text. Such statistics can be used for developing language models, creating classification models, spellchecking, plagiarism detection, etc. One example statistic that may be calculated is a count of n-grams that appear in the text.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
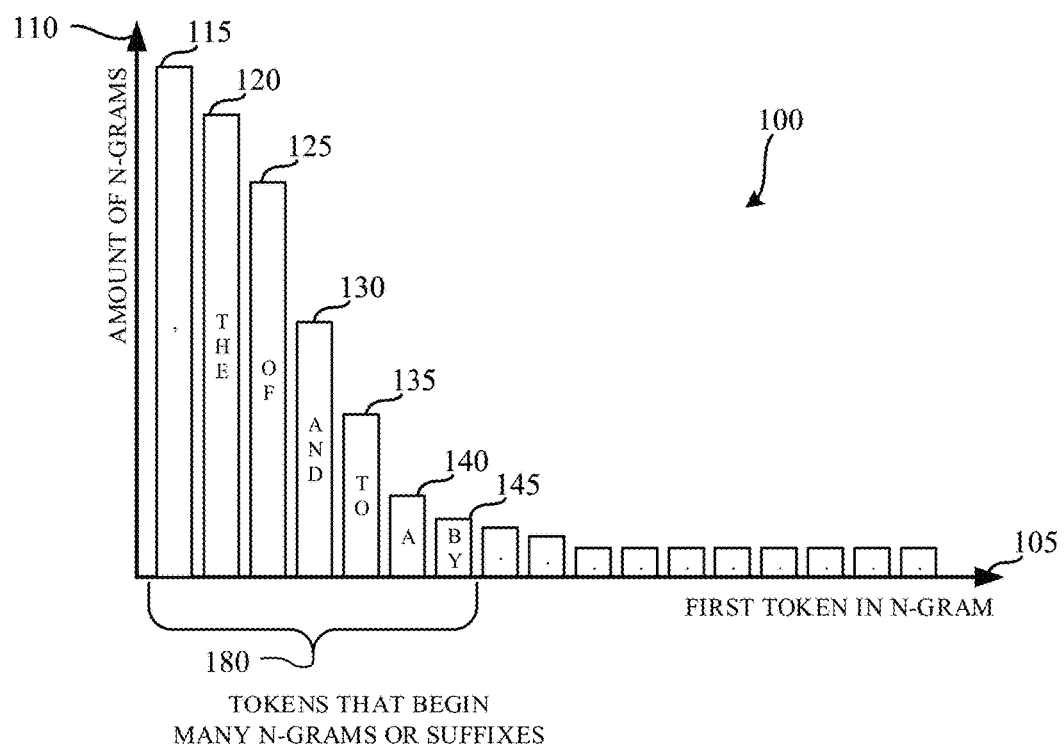
FIG. 1 is a chart illustrating a count of n-grams appearing in text based on the first token of the n-gram.

Computational linguistics systems utilize different statistics concerning text. An important statistic is the number of n-grams that appear in the text. A gram (e.g., a unit of data, a token) is sequence of one or more characters. In some examples, a gram is separated from another sequence of characters by one or more delimiters (e.g., punctuation characters, a space, etc.). In some examples, a gram is a fixed length (e.g., a single character, a fixed number of characters, etc.). A single gram (e.g., a single token) is sometimes referred to as a "unigram," a two gram phrase (e.g., two consecutive tokens) is sometimes referred to as a "bigram", and a three word gram (e.g., three consecutive tokens) is sometimes referred to as a "trigram." An n-gram is a contiguous sequence of a number of grams from a given sequence of data (e.g., text). In some examples, n-grams are sometimes also referred to as phrases. An n-gram can be of any length. That is, an n-gram may be formed by any number of grams. Understanding counts of n-grams appearing in text is an important statistic for computational linguistics.

Some approaches exist for computing count(s) of n-grams appearing in text. For example, a naïve approach reads the text and counts the number of n-grams, keeping a record of n-grams encountered while reading the text. While this approach works well for small bodies of text, because n-grams can be of any length, large corpora (e.g., corpora including Gigabytes of data) typically take a very long time to process (e.g., days, weeks, etc.). As a result, naïve processing of large corpora of text is typically limited to n-grams of a maximum length (e.g., n-grams that include no more than five grams). Such an approach does not account for longer n-grams that might appear in the text.

Another example approach to computing count(s) of n-grams appearing in text is a suffix-sigma approach. The suffix-sigma approach utilizes MapReduce to determine the count(s) of n-grams. MapReduce is a framework that is operated within a HADOOP environment, and enables processing of large amounts of data (e.g., multi-terabyte datasets) in a clustered environment (potentially with hundreds or thousands of clustered computing nodes). A MapReduce job typically includes three types of tasks, mapping tasks performed by a mapping node which operate on partitioned portions of the corpora in parallel to produce key-value pair(s), shuffle tasks that allocate key-value pairs to a particular reducer node, and reduce tasks that operate on the allocated key-value pair(s) to form a final result. The framework sorts the outputs of the maps, which are then input to the reduce tasks. Map tasks and reduce tasks may be performed in parallel (e.g., reduce tasks may begin before completion of all of the map tasks). Typically both the input and the output of the job are stored in a file-system (e.g., a Hadoop Distributed Filing System (HDFS)). The framework takes care of scheduling tasks, monitoring them and re-executes the failed tasks.

The suffix-sigma approach identifies that some n-grams can be condensed based on their suffix (e.g., the last word of the n-gram). For example, while mapping phase of a naïve approach counting the n-grams in a sentence such as "b a x" would emit the n-grams {b a x}, {b a}, {a c}, {b}, {a}, and {x}, such n-grams could be condensed into a representation of three possible suffixes: {b a x}, {b a}, and {b}. In the mapping task of a suffix-sigma MapReduce job, the mapping task emits key-value pairs only for a subset of the n-grams contained in the corpora that represent all suffixes that begin with the same gram (e.g., the same token). To ensure an accurate count, the key-value pairs corresponding to the same suffix must be handled by a single reducer task (although different reducer tasks may operate on other key-value pairs corresponding to other suffixes). Partitioning suffixes based on their first gram only, as opposed to, all grams included in the n-gram, ensures that a single reducer receives all suffixes that begin with the same gram, which enables the suffix-sigma approach to produce an accurate count.

The suffix-sigma approach applies two invariants to achieve its goal. First, all n-grams beginning with the same gram must be grouped together at a single node in the cluster. Second, all n-grams in the single node in the cluster must be sorted in a reverse lexicographical order. Unfortunately, for very large corpora, the first invariant can tend to cause an uneven distribution of work among the nodes in the cluster. Consider how many n-grams in an English text might begin with the word "dog" versus how many n-grams in the same text might begin with the word "the". Since it is expected that many more sentences contain the word "the" than those containing the word "dog," there are correspondingly many more n-grams that begin with "the" than begin with "dog." Further, since almost every piece of English text will contain the word "the," and only some will contain the word "dog," many more nodes in the cluster will contribute n-grams starting with "the."

FIG. 1 is a chart 100 illustrating a count of n-grams appearing in text based on the first token of the n-gram. The example chart of FIG. 1 includes a horizontal axis 105 representing n-grams that begin with a particular token, and a vertical axis 110 representing the number of n-grams that start with that token. In the illustrated example of FIG. 1, many n-grams begin with the tokens "," 115, "the" 120, "of" 125, "and" 130, "to" 135, "a" 140, and "by" 145. The tokens "," 115, "the" 120, "of" 125, "and" 130, "to" 135, "a" 140, and "by" 145, may be thought of as tokens that frequently begin a suffix 180. When the suffix-sigma approach is used, n-grams that begin with the same tokens are each handled by a same reducer (e.g., a single node in the cluster). As shown in the illustrated example of FIG. 1, having an un-even distribution of n-grams that begin with a same token likewise results in an un-even distribution of work among the nodes in the cluster. When the input corpora and cluster size are large, this uneven distribution can become a dominant factor of the run-time of the MapReduce job. In some examples, run-times may become too long to be usable (e.g., days, weeks, etc.), while some clusters become too little utilized to justify the size of a large cluster. For example, while many nodes will complete their reducing tasks for tokens that begin only a few n-grams, some nodes will continue processing data for the tokens that begin many n-grams for a long time.

Example approaches disclosed herein divide the work into three jobs (as opposed to the single MapReduce job of the suffix-sigma approach) and utilize an additional input. In examples disclosed herein, the extra input is a list of words and/or tokens (referred to herein as "hot-words") that cause the majority of the uneven distribution (usually the highest occurring unigrams, such as the tokens that begin many n-grams of FIG. 1). Once the list of "hot-words" is identified, a first job is submitted. The first job utilizes a suffix-sigma approach, with an exception that suffixes beginning with a "hot-word" (referred to herein as "hot-suffixes") are separated from the normal flow of the original suffix-sigma approach. The first job now finishes quickly because all hot-words are removed. As a result, the first job identifies a count of n-grams that do not begin with words appearing in the list of hot-words.

In examples disclosed herein, a second job is then submitted, processing the "hot-suffixes" that were temporarily stored. The second job coerces the data into the required invariants for another localized suffix-sigma run, and performs an initial n-gram counting to reduce data size. A third job is then submitted, which runs a localized version of the suffix-sigma approach, and outputs final counts of n-grams starting with "hot-words," using a naïve word-counting technique. The result of the third job is count(s) of n-grams that begin with words and/or tokens appearing in the list of hot-words. In some examples, the counts of n-grams that begin with words and/or tokens appearing in the list of hot-words is added to the counts of n-grams that do not begin with words and/or tokens appearing in the list of hot-words, to produce total count(s) of n-grams appearing in the text.

Utilizing approaches disclosed herein reduces computation time associated with calculating count(s) of n-grams in a large corpora of text, as well as better utilizes resources of the cluster performing such calculations. For example, given a large input corpora (e.g., a corpora including 1.7 Terabytes of text, and more than 30 billion distinct n-grams), the prior suffix-sigma approach completes approximately 95% of the job within 4 hours using a cluster of 200 nodes, while the remaining 5% of the job takes an additional 17 hours of computation. In general, the last 5% of the job is focused on n-grams that begin with hot-words. Additionally, during the last 5%, many of the nodes in the cluster are left idle, as the only remaining tasks are focused on the n-grams that begin with hot-words, which are focused at a sub-set of nodes in the cluster. A main bottle-neck in the suffix-sigma approach is that many nodes will attempt to transmit their part of the "hot-suffixes" (the result of the mapping task) to a single node (for performance of the reducing task) at the same time. Thus, as the size of input increases, even more load will be placed on the node(s) performing the reducing of n-grams that begin with hot-words, thereby causing additional resource contention and exponential delay in computation.

Example approaches disclosed herein, which separate out processing of n-grams that begin with hot-words, when processing the same large input corpora using the same cluster of 200 nodes, produces a result in 6 hours (e.g., a 350% improvement in runtime). During such computation, the nodes of the cluster are used in a more even distribution (as compared to the strict suffix-sigma approach described above).

Figure 2:
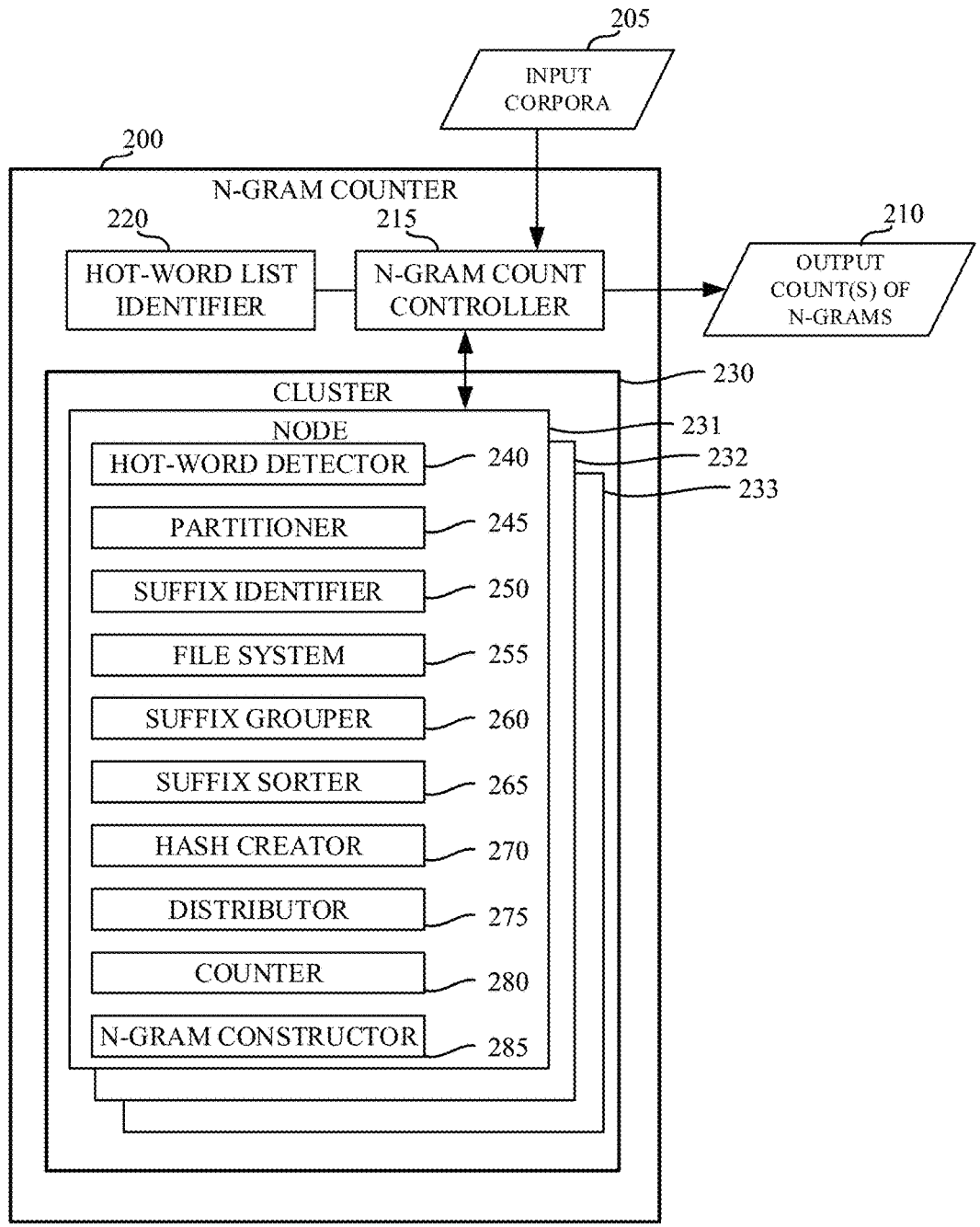
FIG. 2 is a block diagram of an example n-gram counter that identifies a count of n-grams appearing in a corpus.

FIG. 2 is a block diagram of an example n-gram counter 200 that identifies a count of n-grams appearing in a corpus. The example n-gram counter 200 of the illustrated example of FIG. 2 receives an input corpora 205 and outputs count(s) of n-grams 210 appearing in the input corpora. The example n-gram counter 200 of the illustrated example of FIG. 2 includes an n-gram count controller 215, a hot-word list identifier 220, and a cluster 230 of nodes 231, 232, 233.

The example n-gram count controller 215 receives the input corpora 205 and a list of hot-words from the hot-word list identifier 220. The example n-gram count controller 215 coordinates execution of MapReduce jobs at the cluster 230. Using the results of the coordinated MapReduce jobs, the example n-gram count controller 215 outputs the count(s) of n-grams 210 appearing in the input corpora 205. In the illustrated example of FIG. 2, the count(s) of n-grams is a list of n-grams appearing in the input corpora 205 and a corresponding number of occurrences of the n-gram in the input corpora 205. Such information is useful for identification of, for example, a frequency by which a particular n-gram appears in the input corpora, a number of distinct n-grams appearing in the input corpora, etc.

The example hot-word list identifier 220 identifies a list of hot-words for the input corpora 205. In the illustrated example of FIG. 2, the list of hot-words is identified by detecting a language of the input corpora 205 (e.g., English, Spanish, French, etc.) and selecting words and/or tokens that frequently begin suffixes in the detected language. However, any other approach to identifying a list of hot-words may additionally or alternatively be used. For example, a naïve word count of unigrams may be performed, and the word(s) that most frequently occur in the input corpora (e.g. words that appear more than a threshold number of times in the input corpora (words that appear more than 1000 times in the corpora), words that appear a threshold percentage of the input corpora (words that appear more than 5%), a top percentage of the words appearing in the input corpora (the top 5% of the words), a top number of the words appearing in the input corpora (e.g., the fifteen most frequently occurring words), etc.) may be selected for inclusion in the list of hot-words.

The example cluster 230 of the illustrated example of FIG. 2 is a HADOOP cluster. However, any other type of clustered and/or distributed computing environment may additionally or alternatively be used. In the illustrated example of FIG. 2 the example cluster 230 includes nodes 231, 232, 233. While three nodes are shown in the illustrated example of FIG. 2, in practice, any number of nodes 231, 232, 233 may additionally or alternatively be used. For example, tens, hundreds, thousands, etc. of nodes may be included in the cluster 230. In the illustrated example of FIG. 2, each node 231, 232, 233 is implemented by a hardware processor platform in the cluster 230 (e.g., a separate physical processor platform). In some examples, each node 231, 232, 233 is implemented by a virtual processor platform (e.g., a virtual machine, a container, etc.) In the illustrated example of FIG. 2, the cluster 230 is illustrated as a local component of the n-gram counter 200. However, in some examples, the cluster 230 may be implemented remotely from the n-gram counter 200 (e.g., the n-gram count controller 215 and/or the example hot-word list identifier).

In the illustrated example of FIG. 2, each node includes a hot-word detector 240, a partitioner 245, a suffix identifier 250, a file system 255, a suffix grouper 260, a suffix sorter 265, a hash creator 270, a distributor 275, a counter 280, and an n-gram constructor 285. In examples disclosed herein, the nodes 231, 232, 233 implement MapReduce jobs. Thus, each node may, at any given time, be performing mapping tasks, shuffling tasks, and/or reducing tasks. As noted above, mapping tasks operate on partitioned portions of input data in parallel to produce key-value pair(s), shuffle tasks allocate and/or distribute those key-value pairs to another node (e.g., a reducer node), and reducing tasks operate on the allocated and/or distributed key-value pair(s) to form a final result. Any of the example hot-word detector 240, the example partitioner 245, the example suffix identifier 250, the example file system 255, the example suffix grouper 260, the example suffix sorter 265, the example hash creator 270, the example distributor 275, the example counter 280, and/or the example n-gram constructor 285 may be operated during mapping tasks, shuffling tasks, and/or reducing tasks.

The example hot-word detector 240 of the illustrated example of FIG. 2 accesses a list of hot-words for the input corpora provided by the hot-word list identifier 220. Using the accessed list of hot-words, the example hot-word detector 240 compares each of the hot-words to the first term of a suffix identified by the suffix identifier 250 to determine whether a suffix begins with a word in the list of hot-words. By performing such detection, such suffixes can be omitted from the suffix-sigma computations described in connection with FIG. 4. Once omitted from the suffix-sigma computations, the suffixes can be more evenly distributed for n-gram counting than if they had been processed using the suffix-sigma approach. That is, the number of nodes used to process the suffixes is greater than the number of suffixes.

The example partitioner 245 of the illustrated example of FIG. 2 partitions the input corpora into portions to be analyzed by each node. In examples disclosed herein, each partitioner 245 corresponding to each node 231, 232, 233 reads a portion of the input data (e.g., a corpora, a list of hot-word suffixes, a condensed list of suffixes, etc.) and enables such input data to be processed in a mapping job/phase of a MapReduce job.

The example suffix identifier 250 of the illustrated example of FIG. 2 identifies a suffix within a corpus of data (e.g., text). For example, if the corpora of text were "A B C D E", the example suffix identifier 250 would identify suffixes as "A B C D E", "B C D E", "C D E", "D E", and "E". As an additional example, the example suffix identifier 250 may identify "the big dog" as a suffix of the text "I see the big dog". In some examples, when the hot-word detector 240 identifies the word "the" as a hot-word, the example suffix identifier 250 writes the suffix "the big dog" to the file system 255. As a result, the suffix "the big dog" is exempted from processing using the suffix-sigma approach, and is handled using a hot word sort job and a hot-word suffix-sigma job.

The example file system 255 of the illustrated example of FIG. 2 is implemented by a HADOOP distributed file system (HDFS). The example file system 255 stores files (typically very large files, in the range of gigabytes to terabytes and beyond) across multiple nodes 231, 232, 233 in the cluster 230. Data is replicated among the nodes 231, 232, 233 in the cluster 230 to supply redundancy in the event of a node failure.

The example suffix grouper 260 of the illustrated example of FIG. 2 groups suffixes identified by the suffix identifier 250 according to their first term (e.g., their first token). Grouping suffixes according to their first term applies the first invariant of the suffix-sigma approach, which requires that all n-grams beginning with the same token (e.g., a word) be grouped together for reducing at a same node.

The example suffix sorter 265 of the illustrated example of FIG. 2 sorts the grouped suffixes in reverse lexicographical order. Sorting the grouped suffixes in reverse lexicographical order applies the second invariant of the suffix-sigma approach, which requires that all n-grams grouped together at a single node be sorted in reverse lexicographical order. Sorting in reverse lexicographical order facilitates efficient counting of the n-grams.

The example hash creator 270 of the illustrated example of FIG. 2 creates a hash representation of each hot-word suffix in a list of hot-word suffixes. More generally, the example hash creator 270 creates hash representations of n-grams (or portions thereof). In examples disclosed herein, the hash identifies a node 231, 232, 233 in the cluster 230 to which the hot-word suffix should be distributed. Using the example hash creator 270 to create the hash of each of the hot-words ensures that there is an even distribution of the suffixes in the list of hot-word suffixes among the nodes of the cluster. In some examples, the hash creator 270 identifies a hash a hot-word suffix based on the first token (e.g., word) of the suffix.

The example distributor 275 of the illustrated example of FIG. 2 distributes processing of n-grams (e.g., suffixes, hot-word suffixes, etc.) based on a hash of the n-gram created by the hash creator 270. The example distributor 275 forwards the grouped and sorted suffixes to a node of the cluster 230 for reducing based on the sorting and grouping of the suffixes.

The example counter 280 of the illustrated example of FIG. 2 aggregates and/or outputs counts of n-grams received at a node. In some examples, the counter 280 counts a number of n-grams beginning with each suffix. In some examples, the counter 280 performs naïve word counting to aggregate a number of occurrences of received n-grams or suffixes.

The example n-gram constructor 285 of the illustrated example of FIG. 2 constructs n-grams using one or more prefixes of received suffixes. For example, if the example n-gram constructor 285 receives the suffix "the big dog," the example n-gram constructor 285 constructs the n-grams "the," "the big," and "the big dog." The example n-gram constructor 285 creates the n-grams by iterating through combinations of terms in the suffix that begin with the first term of the suffix. In examples disclosed herein, the example n-gram constructor 285 does not identify the n-grams "big," "big dog," or "dog" as n-grams that begin with the first word of the suffix (e.g., because they do not begin with "the").

While an example manner of implementing the example n-gram counter 220 is illustrated in FIG. 2, one or more of the elements, processes and/or devices illustrated in FIG. 2 may be combined, divided, re-arranged, omitted, eliminated and/or implemented in any other way. Further, the example n-gram count controller 215, the example hot-word list identifier 220, the example hot-word detector 240, the example partitioner 245, the example suffix identifier 250, the example file system 255, the example suffix grouper 260, the example suffix sorter 265, the example hash creator 270, the example distributor 275, the example counter 280, the example n-gram constructor 285, and/or, more generally, the example n-gram counter 200 of FIG. 2 may be implemented by hardware, software, firmware and/or any combination of hardware, software and/or firmware. Thus, for example, any of the example n-gram count controller 215, the example hot-word list identifier 220, the example hot-word detector 240, the example partitioner 245, the example suffix identifier 250, the example file system 255, the example suffix grouper 260, the example suffix sorter 265, the example hash creator 270, the example distributor 275, the example counter 280, the example n-gram constructor 285, and/or, more generally, the example n-gram counter 200 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example n-gram count controller 215, the example hot-word list identifier 220, the example hot-word detector 240, the example partitioner 245, the example suffix identifier 250, the example file system 255, the example suffix grouper 260, the example suffix sorter 265, the example hash creator 270, the example distributor 275, the example counter 280, the example n-gram constructor 285, and/or, more generally, the example n-gram counter 200 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example n-gram counter 200 of FIG. 2 may include one or more elements, processes and/or devices in addition to, or instead of, those illustrated in FIG. 2, and/or may include more than one of any or all of the illustrated elements, processes and devices.

Figure 3:
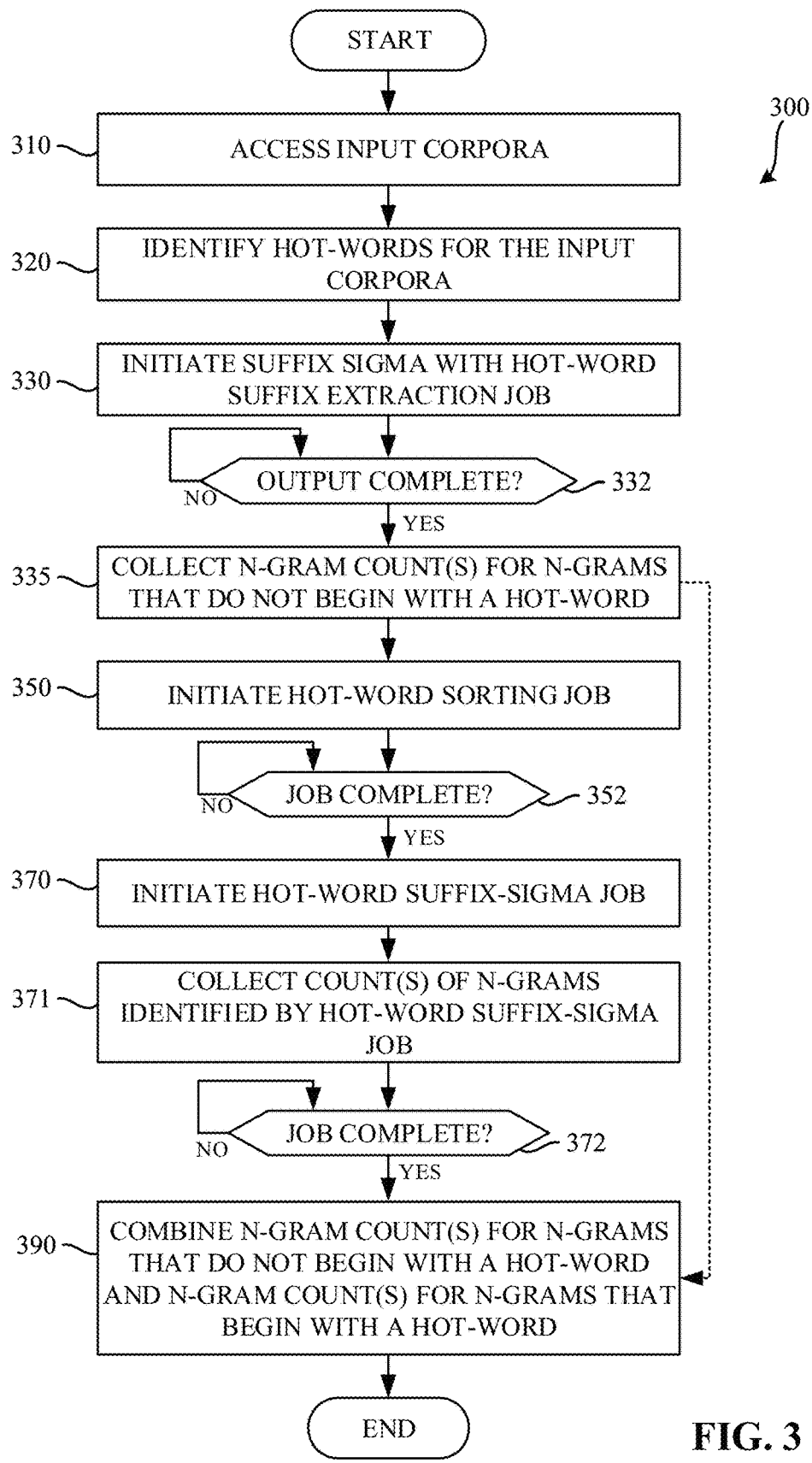
FIG. 3 is a flowchart representative of example machine-readable instructions which, when executed, cause the n-gram counter of FIG. 2 to identify a count of n-grams appearing in a corpus.
Figure 4:
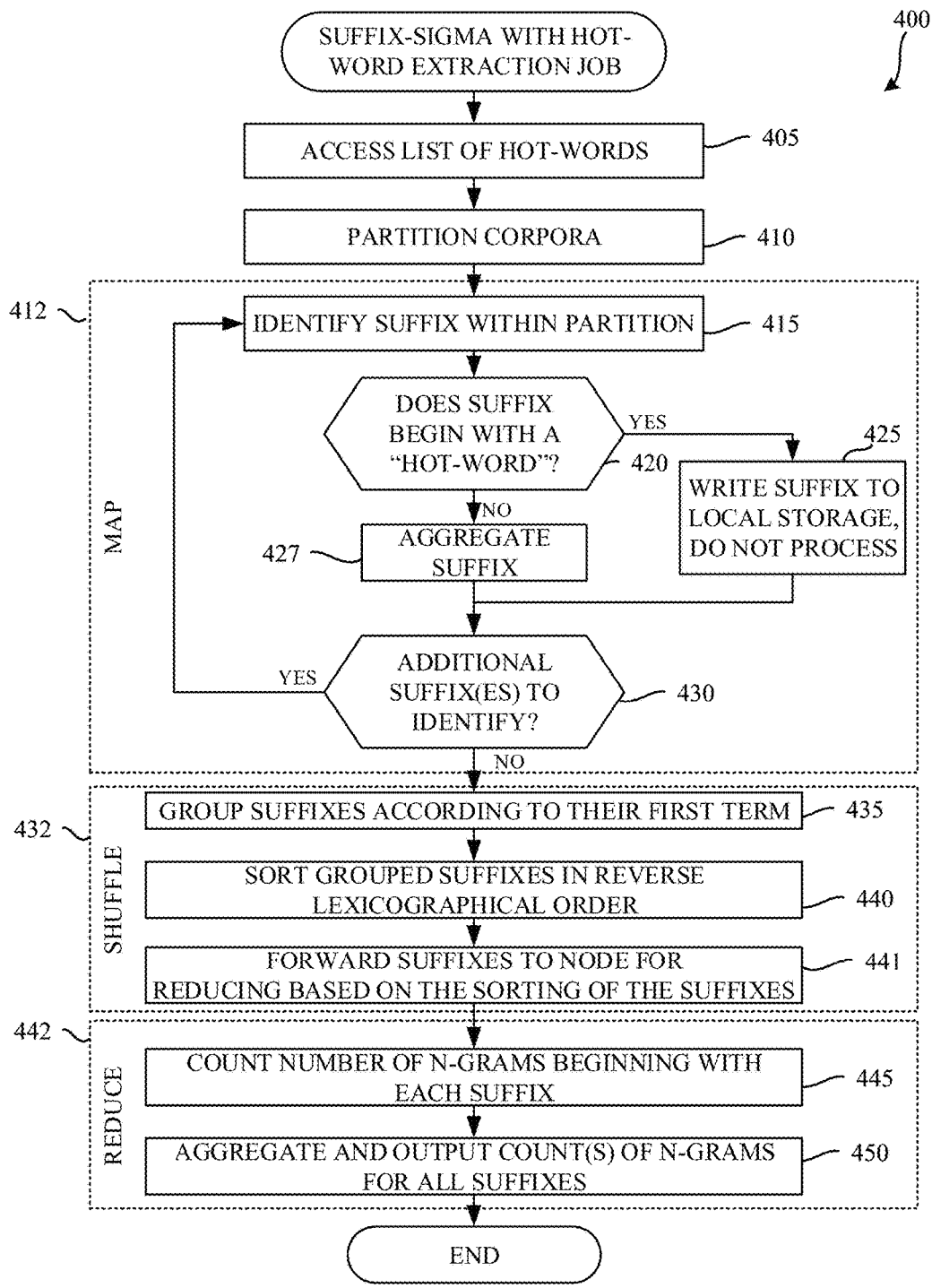
FIG. 4 is a flowchart representative of example machine readable instructions which, when executed, cause the cluster of FIG. 2 to perform a suffix-sigma with hot word extraction job at one or more nodes of the example cluster of FIG. 2.
Figure 5:
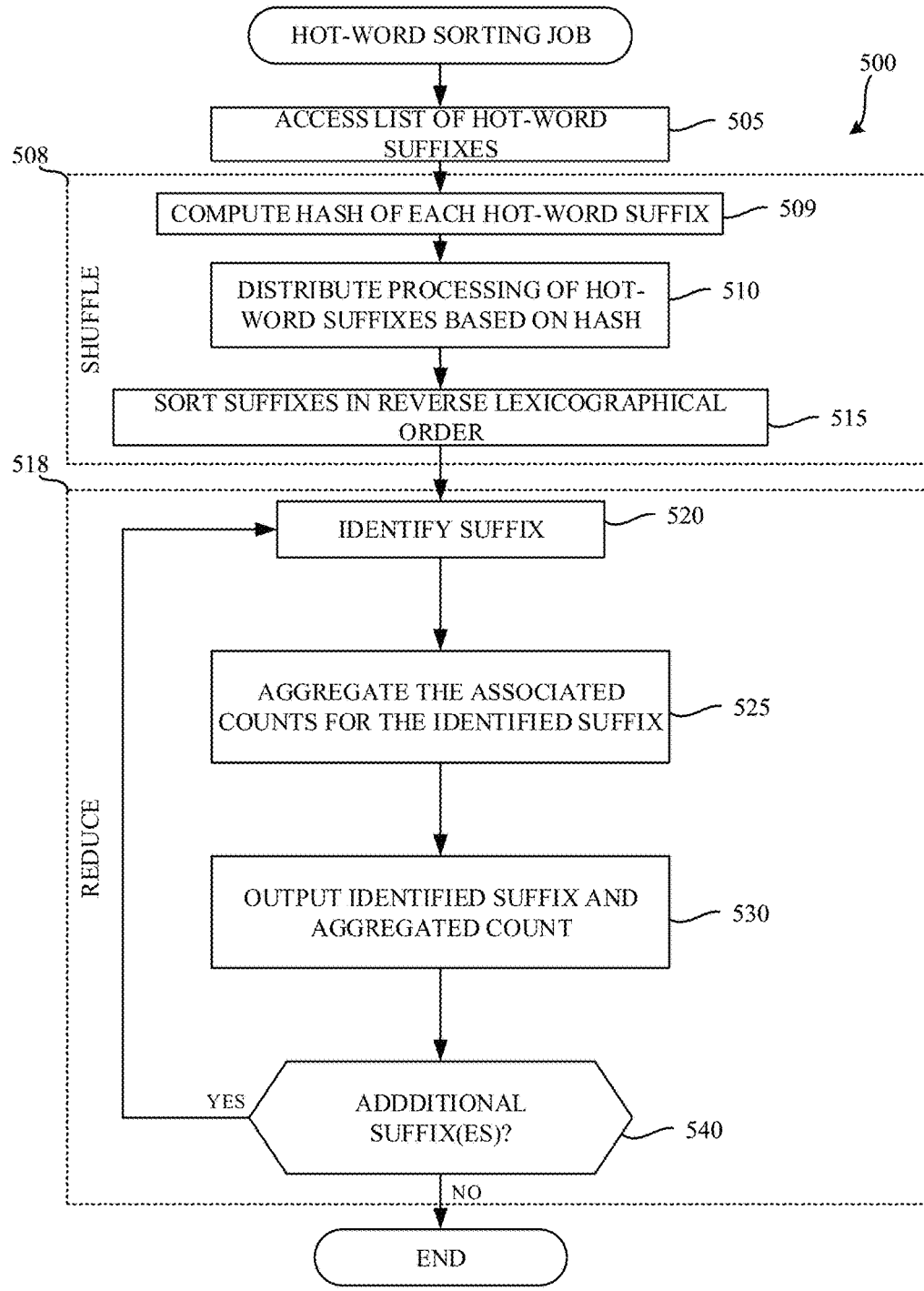
FIG. 5 is a flowchart representative of example machine-readable instructions which, when executed, cause the cluster of FIG. 2 to perform a hot-word sorting job at one or more nodes of the example cluster of FIG. 2.

Flowcharts representative of example machine readable instructions for implementing the example n-gram counter 200 of FIG. 2 are shown in FIGS. 3, 4, 5, and/or 6. In these examples, the machine readable instructions comprise a program(s) for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a solid-state memory, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart(s) illustrated in FIGS. 3, 4, 5, and/or 6, many other methods of implementing the example n-gram counter 200 may alternatively be used. For example, the order of execution of the blocks may be changed, and/or some of the blocks described may be changed, eliminated, or combined.

As mentioned above, the example processes of FIGS. 3, 4, 5, and/or 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3, 4, 5 and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is a flowchart representative of example machine-readable instructions 300 which, when executed, cause the n-gram counter 200 of FIG. 2 to identify a count of n-grams appearing in a corpus. The example process 300 begins when the example n-gram count controller accesses the input corpora Block 310. The example n-gram count controller interacts with the hot word list identifier to identify a list of hot-words for the input corpora 205 block 320. In examples disclosed herein the hot word list is identified based on the language of the input corpora 205. As such, the example hot word list identifier identifies the hot-words for the input corpora by determining a language of the input corpora 205, and selecting a list (e.g., a predefined list) for the identified language. However, the example hot word list may be identified in any other fashion such as, for example, determining a list of words that occur the most frequently in the input corpora (e.g. words that appear more than a threshold number of times in the input corpora (words that appear more than 1000 times in the corpora), words that appear a threshold percentage of the input corpora (words that appear more than 5%), a top percentage of the words appearing in the input corpora (the top 5% of the words), etc.).

The example n-gram count controller 215 initiates a suffix-sigma with hot-word extraction job on the cluster (block 330). In the illustrated example of FIG. 3, both the corpora and the list of hot-words are provided as inputs to the cluster. The example suffix-sigma with hot-word extraction job initiated at block 330 is similar to the suffix-sigma approach described above, with the exception that n-grams having a suffix within the hot-words list are omitted from the calculation, and output separately. An example approach to performing the suffix-sigma with hot-word a suffix extraction job is disclosed below in connection with FIG. 4. In the illustrated example of FIG. 3, n-grams having a suffix within the hot-word list are output to the file system 255 using a HADOOP MultipleOutputs function. However, any other approach to outputting n-grams to the file system 255 may additionally alternatively be used. As a result, n-grams that begin with a suffix in the hot-word list are skipped from counting at this point, and do not need to conform to the two invariants used in the suffix-sigma approach. The cluster 230 returns counts of occurrences for n-grams identified by the suffix-sigma with hot-word extraction job to the n-gram count controller 215. The example n-gram count controller 215 determines whether an output of the initiated suffix-sigma with hot-word suffix extraction job is complete (block 332). If the example n-gram count controller 215 determines that the output is complete when the initiated suffix-sigma with hot-word suffix extraction job is completed. However, any other indicator may additionally or alternatively be used such as, for example, an indication that mapping tasks associated with the initiated suffix-sigma with hot-word suffix extraction job are complete (e.g., which serves as an indicator that the list of n-grams having suffixes within the hot-word list stored in the file system 255 output by the example suffix-sigma with hot-word suffix extraction job is complete). If the output is not complete (block 332 returns a result of NO), the example n-gram count controller 215 waits until the output is complete. In some examples, the n-gram count controller 215 may wait a threshold amount of time before again determining whether the output is complete.

Once the output of the example suffix-sigma with hot-word suffix extraction job is complete (block 332 returns a result of YES), the example n-gram count controller 215 collects the number of n-grams returned by the suffix-sigma with hot-word extraction job (block 335). As noted in connection with FIG. 1, this returned number of n-grams typically represents 95% of the mapped input. However, this number does not reflect n-grams that begin with words in the hot list. As noted above, had the list of hot-words not been used, because of the invariants applied by the suffix-sigma approach, those n-grams would be allocated to a single node for counting. Such an approach disproportionately distributes work to nodes within the cluster, thereby causing extended computation time and ineffective (e.g., uneven) utilization of resources of the cluster. The collected count (s) of n-grams returned by the suffix-sigma with hot-word extraction job may be later used by the n-gram count controller to form total count(s) of n-grams appearing in the input corpora (see block 390).

With each list of n-grams having suffixes within the hot-word list stored in the file system 255, the example n-gram count controller 215 initiates a hot-word sorting job to distribute the "hot-prefixes" evenly across the entire cluster (block 350). An example approach to implementing the hot-word sorting job at each of the nodes is disclosed below in connection with FIG. 5. In the illustrated example of FIG. 3, the hot-word sorting job does not follow the first invariants of the suffix-sigma approach. However, the second invariant (reverse lexicographical sorting) is applied, and a naïve word count is performed to reduce the number of suffixes returned by each node 231, 232, 233 to a list of unique suffixes that appeared in the file system. The condensed version of the list of suffixes that appeared in the file system 255 is stored as a condensed list in the file system 255. The example n-gram count controller 215 waits until the hot-word sorting job is complete (block 352).

The condensed list stored in the file system 255 does not conform to the first invariant of the suffix-sigma approach. That is, some suffixes beginning with the same hot-word may have been handled by different nodes during the hot-word sorting job (e.g., a first portion of the condensed list processed by a first node may include a suffix included in a second portion of the condensed list processed by a second node).

Upon completion of the hot-word sorting job (e.g., when block 352 returns a result of YES), the example n-gram count controller 215 initiates a hot-word suffix-sigma job (block 370). Although the output of the previous job did not conform to invariant one, meaning, suffixes beginning with the same "hot-word" will appear in different processing chunks for this job, invariant two was maintained, meaning, they are all sorted in reverse lexicographical order. When executing the hot-word suffix-sigma job, the example nodes 231, 232, 233 of the cluster 230 construct n-grams by taking prefixes of each of the suffixes in the condensed list, distributing those n-grams, and performing a naïve word count to aggregate occurrences of each n-gram. During execution of the hot-word suffix-sigma job, the example n-gram count controller 215 collects count(s) of n-grams identified by the hot-word suffix sigma job (block 371) (e.g., counts of n-grams that begin with a hot-word, which were not identified by the suffix-sigma with hot-word suffix extraction job of block 330). The example n-gram count controller 215 waits until the hot-word suffix-sigma job is complete (block 372).

Upon completion of the hot-word suffix-sigma job (e.g., when block 372 returns a result of YES), the example n-gram count controller 215 combines the n-gram count(s) for n-grams that do not begin with a hot-word (the count(s) collected in block 335) with the n-gram count(s) for n-grams that begin with a hot-word (e.g., the count(s) collected in block 371) to form total count(s) for n-grams in the input corpora (block 390).

FIG. 4 is a flowchart representative of example machine readable instructions 400 to perform a suffix-sigma with hot word extraction job at one or more nodes 231, 232, 233 of the example cluster 230 of FIG. 2. The example process 400 the illustrated example of FIG. 4 begins when the example hot-word detector 240 accesses a list of hot-words for the input corpora (block 405). The example partitioner 245 partitions the input corpora (block 410). The partitions are each handled by a node 231, 232, 233 in the cluster 230 for performance of a mapping task 412 of the map reduce job of FIG. 4.

The example suffix identifier 250 identifies a suffix within the partition allocated to the node 231, 232, 233 on which the suffix identifier 250 operates (block 415). The example hot-word detector 240 determines whether the suffix begins with a hot-word in the list of hot-words (block 420). If the suffix begins with a hot-word (block 420 returns a result of YES), the example suffix identifier 250 writes the suffix to a list of hot-word suffixes stored on the file system 255 (block 425). In the illustrated example of FIG. 4, the suffixes are written to the file system 255 using a HADOOP MultipleOutputs function. However, any other approach to writing a suffix to the file system 255 may additionally alternatively be used. Suffixes that are written to the file system 255 are not processed further in the example instructions 400 of FIG. 4. Processing of such suffixes is later handled in connection with FIGS. 5 and/or 6, disclosed below.

If the suffix does not begin with a hot-word (block 420 returns a result of NO), the example suffix identifier 250 aggregates the suffix for further processing (block 427). The example suffix identifier 250 determines whether additional suffixes exist for comparison with the words in the list of hot-words (block 430). If additional suffixes exist (block 430 returns a result of YES), the process of blocks 415 through 430 is repeated until no additional suffixes exist (until block 430 returns a result of NO).

The suffix-sigma with hot-word extraction job of FIG. 4 proceeds to a shuffle task block 432. The example suffix grouper 260 groups suffixes according to their first term (e.g., their first token) (block 435). Grouping suffixes according to their first term applies the first invariant of the suffix-sigma approach. The example suffix sorter 265 sorts the grouped suffixes in reverse lexicographical order (block 440). Sorting the grouped suffixes in reverse lexicographical order applies the second invariant of the suffix-sigma approach. The example distributor 275 forwards the grouped and sorted suffixes to a node (e.g., a node separate from the node operating the mapping task 412, the same node that operated the mapping task 412) for reducing based on the sorting and grouping of the suffixes (block 441). That is, each suffix beginning with the same term is sent to a same node for reducing.

During a reduce task 442, the example counter 280 (operating at a reducer node) counts the number of n-grams beginning with each suffix (block 445). The example counter 280 aggregates and outputs the counts of n-grams for all suffixes forwarded to that node (block 450). The example instructions 400 implementing the example suffix-sigma with hot-word extraction job then terminate, having prepared count(s) of n-grams that do not begin with words in the list of hot-words.

FIG. 5 is a flowchart representative of example machine-readable instructions 500 to perform a hot-word sorting job at one or more nodes 231, 232, 233 of the example cluster 230 of FIG. 2. In the illustrated example of FIG. 5, no mapping task is shown. In the illustrated example of FIG. 5, the mapping task of the hot word sorting job is an identity task. That is, the mapping task simply return an input of the job (e.g., the accessed list of hot-word suffixes) for a shuffle task 508. The example process 500 of the illustrated example of FIG. 5 begins when the hash creator 270 accesses the list of hot-word suffixes stored on the file system 255 (block 505) (see block 425). During the shuffle task 508, the example hash creator 270 computes a hash representation of each hot-word suffix in the accessed list of hot-word suffixes (block 509). In examples disclosed herein, the hash identifies a node in the cluster 230 to which the hot-word suffix should be distributed. The example distributor 275 distributes processing of hot-word suffixes based on computed hashes of the hot-words in the list of hot-word suffixes (e.g., using the hash to identify a node that is to perform a reducing task 518) (block 510). In the illustrated example of FIG. 5, creating the hash of the hot-words ensures that there is an even distribution of the suffixes in the list of hot-word suffixes among the nodes 231, 232, 233 of the cluster 230.

The example suffix sorter 265 sorts the distributed suffixes in reverse lexicographical order (block 515). Sorting the grouped suffixes in reverse lexicographical order applies the second invariant of the suffix-sigma approach, and ensures that all like suffixes are provided to the node performing the reducing task 518 in order. When key-value pairs are provided to a node in order, the key-value pairs are provided as a key, followed by multiple values for the same key (corresponding to each of the key-value pairs that are ordered using the same key), thereby reducing any transmission overhead associated with transmitting key-value pairs.

The example suffix identifier 250 identifies a suffix distributed to the node performing the reduce task (block 520). The example counter 280 aggregates the associated counts for the identified suffix (block 525). The example counter 280 outputs the identified suffix and aggregated count (block 530). In the illustrated example of FIG. 5, if the input suffixes indicated that the suffix "the big dog" appeared 5 and 6 times, the example counter 280 would output a key value pair of "key: 'the big dog' value: 11." The example suffix identifier 250 determines whether an additional suffix(es) was provided to the node 231, 232, 233 performing the reducing task 518 (block 540). If an additional suffix was provided (block 540 returns a result of YES), the operations of 520 through 540 are repeated until all suffixes have had their associated counts aggregated and output.

The example hot-word sorting job implemented by the example instructions 500 of FIG. 5 then terminates. As a result, the output of the example hot-word sorting job is a list of key-value pairs corresponding to suffixes and their number of occurrences. Counting the number of occurrences of each suffix reduces an amount of data to be read in a subsequent suffix-sigma word count job. Such a reduction more timely completion of data transfer between nodes of the cluster, as a reduced list is transmitted instead of a list including duplicative data. Table 1, below represents an example output of the example instructions 500 of FIG. 5:

TABLE 1

| Key (suffix) | Value |
| --- | --- |
| the big dog | 11 occurrences |
| the big cat | 8 occurrences |

Table 1, above, includes two columns: a key column, and a value column. In the illustrated example of table 1, the key column represents a suffix, and the value column represents a number of occurrences of the suffix in the list of hot-word suffixes (e.g., as accessed at block 505). The example table 1 is processed further via a suffix-sigma word count job described below in connection with FIG. 6.

Figure 6:
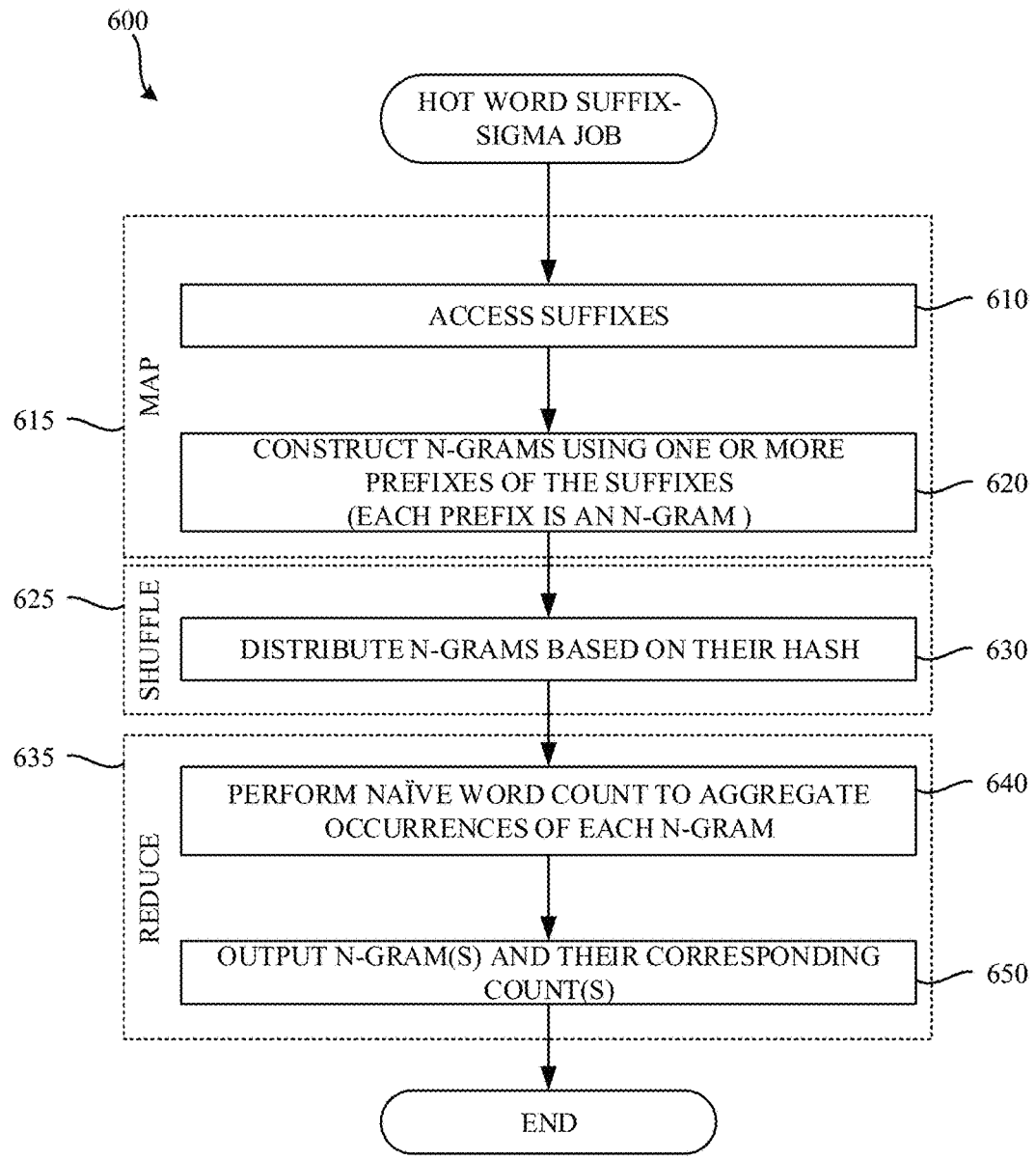
FIG. 6 is a flowchart representative of example machine-readable instructions which, when executed, cause the cluster of FIG. 2 to perform a suffix-sigma word count job using the sorted hot-word suffixes at one or more nodes of the example cluster of FIG. 2.

FIG. 6 is a flowchart representative of example machine-readable instructions 600 to perform a suffix-sigma word count job using the sorted hot-word suffixes at one or more nodes 231, 232, 233 of the example cluster 230 of FIG. 2. The example program 600 of FIG. 6 begins when the example suffix identifier accesses the sorted and condensed suffixes output by the example counter 280 at block 530 of FIG. 5 (block 610). The example n-gram constructor 285 constructs n-grams using one or more prefixes of each of the suffixes (block 620). Continuing the example of Table 1, above, assume a first node 231 operating a mapping task 615 of FIG. 6 receives the suffix "the big dog." Similarly, assume a second node 232 operating the mapping task 615 receives the suffix "the big cat." The example n-gram constructor 285 of the first node 231 constructs the n-grams "the," "the big," and "the big dog." The example n-gram constructor 285 of the second node 232 constructs the n-grams "the," "the big," and "the big cat." With each constructed n-gram, the n-gram constructor 285 applies the value that was associated with the originating suffix. Following the example of Table 1, the n-gram "the" originating from "the big dog" receives a value of 11, whereas the n-gram "the" originating from "the big cat" receives a value of 8 (corresponding to the number of occurrences of "the big dog" and "the big cat," respectively).

At a shuffling task 625, the constructed n-grams are distributed based on a hash of the n-gram (block 630). As a result, like n-grams will be distributed to a same node performing a reducing task 635. For example, the n-gram "the" (from "the big dog") will be distributed to a same node as the n-gram "the" (from "the big cat"). Likewise, the n-gram "the big" (from "the big dog") will be distributed to a same node as the n-gram "the big" (from "the big cat") (which may or may not be the same node as the n-gram "the"). The n-grams "the big dog" and "the big cat" are likely not distributed to the same node (but may be if their hashed values indicate that they should be distributed to the same node). For example, the n-gram "the" is be transmitted to a first node, the n-gram "the big" is be transmitted to a second node, the n-gram "the big dog" is transmitted to a third node, and the n-gram "the big cat" is transmitted to a fourth node. Any of the first node, the second node, the third node, and/or the fourth node may be the same node.

With like n-grams distributed to nodes performing the reduce task 635, the example counter 280 of each node performing the reduce task 635 performs a naïve word count to aggregate occurrences of each n-gram (block 640). For example, the example counter 280 of the second node, which received the n-gram "the big" originating from both "the big dog" and "the big cat," naïvely identifies that "the big" is the same, and has a count of nineteen (corresponding to the 11 occurrences of "the big" from "the big dog" and the 8 occurrences of "the big" from "the big cat"). The example counter 280 outputs the n-gram(s) and their corresponding count(s) (block 650). The example process 600 of FIG. 6 then terminates. In some examples, the example process 300 proceeds (see block 390) to combine the n-grams and their corresponding counts output at block 650 (that correspond to suffixes that began with a hot-word) with the n-grams and their corresponding counts output at block 330 (see FIG. 3) to form total n-gram count(s) for all n-grams appearing in the input corpora.

Figure 7:
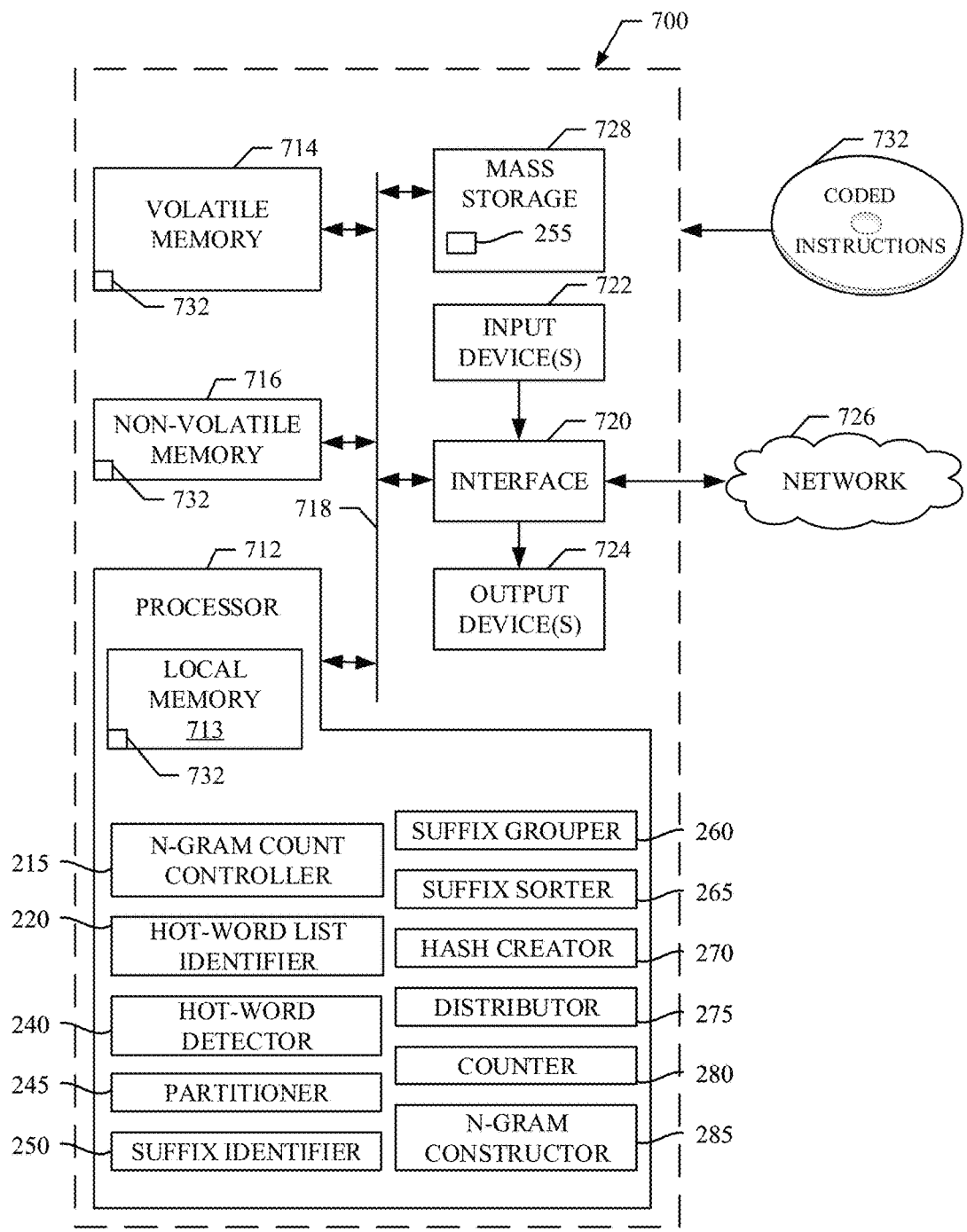
FIG. 7 is a block diagram of an example processor platform capable of executing the instructions of FIGS. 3, 4, 5, and/or 6 to implement the example n-gram counter of FIG. 2.

FIG. 7 is a block diagram of an example processor platform 700 capable of executing the instructions of FIGS. 3, 4, 5, and/or 6 to implement the example n-gram counter 200 of FIG. 2. The processor platform 700 can be, for example, a server, a personal computer, a mobile device (e.g., a cell phone, a smart phone, a tablet such as an iPad™), an Internet appliance, a gaming console, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache) and executes instructions to implement the example n-gram count controller 215, the example hot-word list identifier 220, the example hot-word detector 240, the example partitioner 245, the example suffix identifier 250, the example suffix grouper 260, the example suffix sorter 265, the example hash creator 270, the example distributor 275, the example counter 280, and/or the example n-gram constructor 285. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives. In some examples, the example mass storage device 728 implements the example file system 255.

The coded instructions 732 of FIGS. 3, 4, 5 and/or 6 may be stored in the mass storage device 728, in the volatile memory 714, in the non-volatile memory 716, and/or on a removable tangible computer readable storage medium such as a CD or DVD.

From the foregoing, it will be appreciated that the above disclosed methods, apparatus and articles of manufacture enable counting of n-grams appearing in data (e.g., a corpora of text) more efficiently than prior known approaches. For example, by splitting out processing of n-grams that begin with frequently occurring "hot-words", computation is more evenly distributed among nodes within a cluster, resulting in a more efficient use of processing resources. Moreover, because resources are utilized more efficiently, counting of n-grams can be performed more frequently. More frequent processing enables more up-to-date statistics concerning the processed corpora.

Example 1 includes an apparatus to identify a count of n-grams appearing in a corpus, the apparatus comprising a hot-word detector to identify a token that frequently begins a suffix found in the corpus, a suffix identifier to identify first suffixes and second suffixes within the corpus, the suffix identifier to detect that the first suffixes begin with the token and that the second suffixes do not begin with the token, and an n-gram count controller to direct a cluster of nodes to perform a first counting algorithm to identify a first count of n-grams appearing in the first suffixes, the n-gram count controller to direct the cluster of nodes to perform a second counting algorithm to identify a second count of n-grams appearing in the second suffixes, the second counting algorithm different from the first counting algorithm.

Example 2 includes the apparatus of example 1, wherein the cluster of nodes performs the second counting algorithm by distributing the second suffixes among a first number of nodes in the cluster, the first number of nodes greater than a second number of suffixes appearing in the second suffixes.

Example 3 includes the apparatus of any one of examples 1-2, wherein the token that frequently begins the suffix is identified based on a detected language of the corpus.

Example 4 includes the apparatus of any one of examples 1-3, wherein the first counting algorithm is a suffix-sigma count.

Example 5 includes the apparatus of any one of examples 1-4, wherein the first counting algorithm is performed using a MapReduce job executed within a clustered computing environment.

Example 6 includes the apparatus of any one of examples 1-5, wherein, to perform the second counting algorithm, each node of the cluster includes a suffix sorter to sort the second suffixes in a reverse lexicographical order, a counter to condense the second suffixes into a list of suffixes and a number of occurrences of each suffix in the second suffixes, an n-gram constructor to construct n-grams that begin with a prefix of each suffix in the list of suffixes, the counter to aggregate a count of the constructed n-grams to identify the second count of n-grams appearing in the second suffixes.

Example 7 includes the apparatus of example 6, wherein the aggregating of the count of the constructed n-grams is based on the number of occurrences of the suffixes used to construct the corresponding n-gram.

Example 8 includes the apparatus of any one of examples 1-7, wherein the n-gram count controller is further to combine the first count with the second count to form a total count of n-grams appearing in the corpus.

Example 9 includes a method of identifying a count of n-grams appearing in a corpus, the method comprising identifying a token that frequently begins a suffix found in the corpus, identifying first suffixes and second suffixes within the corpus, detecting that the first suffixes begin with the token and that the second suffixes do not begin with the token, performing a first counting algorithm to identify a first count of n-grams appearing in the first suffixes, and performing a second counting algorithm to identify a second count of n-grams appearing in the second suffixes, the second counting algorithm different from the first counting algorithm.

Example 10 includes the method of example 9, wherein the performing of the second counting algorithm includes distributing the second suffixes among a first number of nodes in a cluster, the first number of nodes greater than a second number of suffixes appearing in the second suffixes.

Example 11 includes the method of any one of examples 9-10, wherein the token that frequently begins the suffix is identified based on a detected language of the corpus.

Example 12 includes the method of any one of examples 9-11, wherein the first counting algorithm is a suffix-sigma count.

Example 13 includes the method of any one of examples 9-12, wherein the first counting algorithm is performed using a MapReduce job executed within a clustered computing environment.

Example 14 includes the method of any one of examples 9-13, wherein the second counting algorithm is performed by sorting the second suffixes in a reverse lexicographical order, condensing the second suffixes into a list of suffixes and a number of occurrences of each suffix in the second suffixes, constructing n-grams that begin with a prefix of each suffix in the list of suffixes, and aggregating a count of the constructed n-grams to identify the second count of n-grams appearing in the second suffixes.

Example 15 includes the method of example 14, wherein the aggregating of the count of the constructed n-grams is based on the number of occurrences of the suffixes used to construct the corresponding n-gram.

Example 16 includes the method of any one of examples 9-15, further including combining the first count with the second count to form a total count of n-grams appearing in the corpus.

Example 17 includes a non-transitory machine-readable medium comprising instructions which, when executed, cause a processor to at least identify a token that frequently begins a suffix found in the corpus, identify first suffixes and second suffixes within the corpus, detect that the first suffixes begin with the token and that the second suffixes do not begin with the token, perform a first counting algorithm to identify a first count of n-grams appearing in the first suffixes, and perform a second counting algorithm to identify a second count of n-grams appearing in the second suffixes, the second counting algorithm different from the first counting algorithm.

Example 18 includes the machine-readable medium of example 17, wherein the performing of the second counting algorithm includes distributing the second suffixes among a first number of nodes in a cluster, the first number of nodes greater than a second number of suffixes appearing in the second suffixes.

Example 19 includes the machine readable medium of any one of examples 17-18, wherein the token that frequently begins the suffix is identified based on a detected language of the corpus.

Example 20 includes the machine readable medium of any one of examples 17-19, wherein the first counting algorithm is a suffix-sigma count.

Example 21 includes the machine readable medium of any one of examples 17-20, wherein the first counting algorithm is performed using a MapReduce job executed within a clustered computing environment.

Example 22 includes the machine readable medium of any one of examples 17-21, wherein the instructions, when executed, further cause the machine to perform the second counting algorithm by sorting the second suffixes in a reverse lexicographical order, condensing the second suffixes into a list of suffixes and a number of occurrences of each suffix in the second suffixes, constructing n-grams that begin with a prefix of each suffix in the list of suffixes, and aggregating a count of the constructed n-grams to identify the second count of n-grams appearing in the second suffixes.

Example 23 includes the machine readable medium of example 22, wherein the aggregating of the count of the constructed n-grams is based on the number of occurrences of the suffixes used to construct the corresponding n-gram.

Example 24 includes the machine readable medium of any one of examples 17-23, wherein the instructions, when executed, further cause the machine to combine the first count with the second count to form a total count of n-grams appearing in the corpus.

Example 25 includes an apparatus to identify a count of n-grams appearing in a corpus, the apparatus comprising means for identifying a token that frequently begins a suffix found in the corpus, means for identifying first suffixes and second suffixes within the corpus, means for detecting that the first suffixes begin with the token and that the second suffixes do not begin with the token, means for performing a first counting algorithm to identify a first count of n-grams appearing in the first suffixes, and means for performing a second counting algorithm to identify a second count of n-grams appearing in the second suffixes, the second counting algorithm different from the first counting algorithm.

Example 26 includes the apparatus of example 25, wherein the means for performing the second counting algorithm includes means for distributing the second suffixes among a first number of nodes in a cluster, the first number of nodes greater than a second number of suffixes appearing in the second suffixes.

Example 27 includes the apparatus of any one of examples 25-26, wherein the token that frequently begins the suffix is identified based on a detected language of the corpus.

Example 28 includes the apparatus of any one of examples 25-27, wherein the first counting algorithm is a suffix-sigma count.

Example 29 includes the apparatus of any one of examples 25-28, wherein the first counting algorithm is performed using a MapReduce job executed within a clustered computing environment.

Example 30 includes the apparatus of any one of examples 25-29, wherein the means for performing the second counting algorithm include means for sorting the second suffixes in a reverse lexicographical order, means for condensing the second suffixes into a list of suffixes and a number of occurrences of each suffix in the second suffixes, means for constructing n-grams that begin with a prefix of each suffix in the list of suffixes, and means for aggregating a count of the constructed n-grams to identify the second count of n-grams appearing in the second suffixes.

Example 31 includes the apparatus of example 30, wherein the aggregating of the count of the constructed n-grams is based on the number of occurrences of the suffixes used to construct the corresponding n-gram.

Example 32 includes the apparatus of any one of examples 25-31, further including means for combining the first count with the second count to form a total count of n-grams appearing in the corpus.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to identify a count of n-grams in a corpus, the apparatus comprising:
    a hot-word detector to identify a token that frequently begins a suffix found in the corpus;
    a suffix identifier to identify first suffixes and second suffixes within the corpus, the suffix identifier to detect that the first suffixes begin with the token and that the second suffixes do not begin with the token; and
    an n-gram count controller to direct a cluster of nodes to perform a first counting algorithm to identify a first count of n-grams in the first suffixes, the n-gram count controller to direct the cluster of nodes to perform a second counting algorithm to identify a second count of n-grams in the second suffixes, the second counting algorithm different from the first counting algorithm, the count of n-grams used as a statistic for computational linguistics.

2. The apparatus of claim 1, wherein the cluster of nodes is to perform the second counting algorithm by distributing the second suffixes among a first number of nodes in the cluster, the first number of nodes greater than a second number of suffixes in the second suffixes.

3. The apparatus of claim 1, wherein the hot word detector is to identify the token that frequently begins the suffix based on a detected language of the corpus.

4. The apparatus of claim 1, wherein the first counting algorithm is a suffix-sigma count.

5. The apparatus of claim 1, wherein the first counting algorithm is to use a MapReduce job executed within a clustered computing environment.

6. The apparatus of claim 1, wherein each node of the cluster includes:
    a suffix sorter to sort the second suffixes in a reverse lexicographical order;
    a counter to condense the second suffixes into a list of suffixes and a number of occurrences of each suffix in the second suffixes; and
    an n-gram constructor to construct n-grams that begin with a prefix of each suffix in the list of suffixes, the counter to aggregate a count of the constructed n-grams to identify the second count of n-grams in the second suffixes.

7. The apparatus of claim 6, wherein the counter is to aggregate the count of the constructed n-grams based on the number of occurrences of the suffixes used to construct the corresponding n-gram.

8. The apparatus of claim 1, wherein the n-gram count controller is to combine the first count with the second count to form a total count of n-grams in the corpus.

9. A method of identifying a count of n-grams in a corpus, the method comprising:
    identifying a token that frequently begins a suffix found in the corpus;
    identifying first suffixes and second suffixes within the corpus;
    detecting that the first suffixes begin with the token and that the second suffixes do not begin with the token;
    performing, by executing an instruction with at least one processor, a first counting algorithm to identify a first count of n-grams in the first suffixes; and
    performing, by executing an instruction with at the least one processor, a second counting algorithm to identify a second count of n-grams in the second suffixes, the second counting algorithm different from the first counting algorithm, the second count of n-grams used as a statistic for computational linguistics.

10. The method of claim 9, wherein the performing of the second counting algorithm includes distributing the second suffixes among a first number of nodes in a cluster, the first number of nodes greater than a second number of suffixes in the second suffixes.

11. The method of claim 9, wherein the identifying of the token that frequently begins the suffix is based on a detected language of the corpus.

12. The method of claim 9, wherein the first counting algorithm is a suffix-sigma count.

13. The method of claim 9, wherein the first counting algorithm is performed using a MapReduce job executed within a clustered computing environment.

14. The method of claim 9, wherein the second counting algorithm includes:
sorting the second suffixes in a reverse lexicographical order;
condensing the second suffixes into a list of suffixes and a number of occurrences of each suffix in the second suffixes;
constructing n-grams that begin with a prefix of each suffix in the list of suffixes; and
aggregating a count of the constructed n-grams to identify the second count of n-grams in the second suffixes.

15. The method of claim 14, wherein the aggregating of the count of the constructed n-grams is based on the number of occurrences of the suffixes used to construct the corresponding n-gram.

16. The method of claim 9, further including combining the first count with the second count to form a total count of n-grams in the corpus.

17. A non-transitory machine-readable medium comprising instructions which, when executed, cause at least one processor to at least:
identify a token that frequently begins a suffix found in the corpus;
identify first suffixes and second suffixes within the corpus;
detect that the first suffixes begin with the token and that the second suffixes do not begin with the token;
perform a first counting algorithm to identify a first count of n-grams in the first suffixes; and
perform a second counting algorithm to identify a second count of n-grams in the second suffixes, the second counting algorithm different from the first counting algorithm, the second count of n-grams used as a statistic for computational linguistics.

18. The machine-readable medium of claim 17, wherein the instructions cause the at least one processor to perform the second counting algorithm by distributing the second suffixes among a first number of nodes in a cluster, the first number of nodes greater than a second number of suffixes in the second suffixes.

19. The machine-readable medium of claim 17, instructions cause the at least one processor to identify that the token that frequently begins the suffix based on a detected language of the corpus.

20. The machine-readable medium of claim 17, wherein the first counting algorithm is a suffix-sigma count.

21. The machine-readable medium of claim 17, wherein the instructions cause the at least one processor to perform the first counting algorithm via a MapReduce job executed within a clustered computing environment.

22. The machine-readable medium of claim 17, wherein the instructions, when executed, cause the at least one processor to perform the second counting algorithm by:
sorting the second suffixes in a reverse lexicographical order;
condensing the second suffixes into a list of suffixes and a number of occurrences of each suffix in the second suffixes;
constructing n-grams that begin with a prefix of each suffix in the list of suffixes; and
aggregating a count of the constructed n-grams to identify the second count of n-grams in the second suffixes.

23. The machine-readable medium of claim 22, wherein the instructions cause the at least one processor to aggregate the count of the constructed n-grams based on the number of occurrences of the suffixes used to construct the corresponding n-gram.

24. The machine-readable medium of claim 17, wherein the instructions, when executed, further cause the at least one processor to combine the first count with the second count to form a total count of n-grams in the corpus.

* * * * *